(12) United States Patent
Jani (10) Patent No.: US 12,185,826 B2
(45) Date of Patent: Jan. 7, 2025

(54) METHODS, SYSTEMS, AND APPARATUSES FOR ROTATABLE AND ROTATING WEARABLE DEVICE MOUNTS

(71) Applicant: Hand Held Products, Inc., Charlotte, NC (US)

(72) Inventor: Hardik Yomesh Jani, Lawrenceville, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 115 days.

(21) Appl. No.: 17/935,519

(22) Filed: Sep. 26, 2022

(65) Prior Publication Data

US 2024/0099446 A1   Mar. 28, 2024

(51) Int. Cl.
A45F 5/02    (2006.01)

(52) U.S. Cl.
CPC ........ *A45F 5/02* (2013.01); *A45F 2200/0516* (2013.01)

(58) Field of Classification Search
CPC ................ A45F 5/02; A45F 2200/0516; A45F 2005/025; A45F 2005/026
See application file for complete search history.

(56) References Cited

U.S. PATENT DOCUMENTS

| | | | |
|---|---|---|---|
| 3,583,734 A * | 6/1971 | Magi | B60R 1/0617 248/478 |
| 7,296,752 B2 | 11/2007 | Carnevali | |
| 9,740,906 B2 | 8/2017 | Alnasser et al. | |
| 10,554,238 B2 * | 2/2020 | Qi | H05K 5/0204 |
| 2004/0192398 A1 | 9/2004 | Zhu | |
| 2006/0140395 A1 * | 6/2006 | Kim | A45F 5/02 379/428.01 |

(Continued)

OTHER PUBLICATIONS

Amazon, "VUP Wristband Phone Holder, 360° Rotatable & Detachable Sports Wristband for iPhone 13 Pro/13/13 mini/12/SE 2020/11/XR/Xs/8/7/Plus, 4"-6.5" Phones, Great for Hiking Biking Walking Gym (Black)", retrieved from the Internet at <URL: https://www.amazon.com/VUP-Wristband-Rotatable-Detachable-4-6-5Phones/dp/B087LTVW8L> on Jan. 13, 2023, 13 pages.

(Continued)

*Primary Examiner* — Robert Sandy
(74) *Attorney, Agent, or Firm* — Alston & Bird LLP (57) ABSTRACT

Methods, apparatuses, systems, computing devices, and/or the like are provided. An example method may include rotating a rotatable mounting apparatus. An example rotatable mounting apparatus may include a first mount engagement element, a second mount engagement element, and a spring disposed between the first mount engagement element and the second mount engagement element. An example first mount engagement element may include a plurality of slots. An example second mount engagement element may include one or more tabs. The example method may include translating the first mount engagement element with respect to the second mount engagement element to compress the spring and disconnect at least a first tab of the one or more tabs from at least a first slot of the plurality of slots. The example method may also include rotating the first mount engagement element with respect to the second mount engagement element.

19 Claims, 11 Drawing Sheets

(56) References Cited

U.S. PATENT DOCUMENTS

2006/0237495 A1* 10/2006 Chen .................. A45F 5/02
224/669

OTHER PUBLICATIONS

Ubuy, "EEEkit Cell Phone Wristband, 360° Rotatable Sports Wristband Cell Phone Holder, Forearm Armband for Hiking Biking Walking Running, Compatible with iPhone Galaxy Pixel LG Sony (Black)", retrieved from the Internet at <URL:https://www.u-buy.com.ng/product/3EC1SI-eeekit-cell-phone-wristband-360-rotatable-sports-wristband-cell-phone-holder-forearm-armband-for-hik> on Jan. 13, 2023, 4 pages.
CN Notice of Allowance Mailed on Feb. 7, 2024 for CN Application No. 202322283777, 2 page(s).
CN Office Action Mailed on Dec. 14, 2023 for CN Application No. 202322283777, 1 page(s).
English translation of CN Notice of Allowance dated Feb. 7, 2024 for CN Application No. 202322283777, 2 page(s).
English Translation of CN Office Action dated Dec. 14, 2023 for CN Application No. 202322283777, 1 page(s).

\* cited by examiner

METHODS, SYSTEMS, AND APPARATUSES FOR ROTATABLE AND ROTATING WEARABLE DEVICE MOUNTS

TECHNICAL FIELD

The present disclosure relates generally to wearable devices. In particular, it relates to rotatable or rotating mounts for use with wearable devices, such as, but not limited to, those used in industrial, logistics, and warehouse applications.

BACKGROUND

Wearable devices (such as smart phones, scanners, computers, radio frequency identification devices, and other electronic device) can be difficult to adjust and use efficiently for different users who may have different preferences of mounting location, different body shapes, and different usability needs for their devices. To consider preferences for different users, companies or individual users need to invest in separate units for users of different needs (e.g., right and left-hand users), and manufacturers are required to make multiple SKUs to accommodate the different users.

Through applied effort, ingenuity, and innovation, Applicant has solved problems relating to heterogeneous design angles and orientation for wearable devices by developing solutions embodied in the present disclosure, which are described in detail below.

SUMMARY

In general, embodiments of the present disclosure provide methods, apparatuses, systems, computing devices, computing entities, and/or the like.

Various embodiments of the present disclosure may include a rotatable mounting apparatus. In some embodiments, the apparatus may include a first mount engagement element. In some embodiments, the first mount engagement element may include a plurality of slots. In some embodiments, the apparatus may include a second mount engagement element. In some embodiments, the second mount engagement element may include one or more tabs. In some embodiments, the apparatus may include a spring configured to be disposed between at least a portion of the first mount engagement element and at least a portion of the second mount engagement element to urge at least one of the one or more tabs towards at least one of the plurality of slots. In some embodiments, the first mount engagement element and the second mount engagement element are rotatable relative to each other, such that a first tab of the one or more tabs is configured to engage a first slot of the plurality of slots at a first rotational position and engage a second slot of the plurality of slots at a second rotational position.

In some embodiments, the first mount engagement element defines a partially circular shape. In some embodiments, the plurality of slots are disposed at a same radial position with respect to the first mount engagement element.

In some embodiments, the second mount engagement element defines a partially circular shape. In some embodiments, the one or more tabs are disposed at a same radial position with respect to the second mount engagement element.

In some embodiments, the spring is configured to be disposed between the at least partially circular shape of the first mount engagement element and the at least partially circular shape of the second mount engagement element.

In some embodiments, the plurality of slots are radially positioned along a circumference of the first mount engagement element.

In some embodiments, the plurality of slots are radially positioned along an arc measuring 180 degrees or less along the circumference of the first mount engagement element.

In some embodiments, the spring includes a linear wave spring disposed along a portion of circumferential surfaces of the first mount engagement element and the second mount engagement element.

In some embodiments, the spring includes a circular spring.

In some embodiments, the second mount engagement element is a rotating element configured to fixedly engage and rotate with a wearable device. In some embodiments, the first mount engagement element is a fixed element configured to fixedly engage an attachment mechanism.

In some embodiments, the second mount engagement element is configured to translate and rotate along a plane relative to the first mount engagement element.

In some embodiments, the spring is configured to at translationally urge the second mount engagement element relative to the first mount engagement element in one or more directions along the plane while permitting the second mount engagement element to be disposed at a plurality of rotational positions relative to the first mount engagement element.

In some embodiments, the spring is disposed along a portion of circumferential surfaces of the first mount engagement element and the second mount engagement element. In some embodiments, in an instance in which the spring is compressed, the spring is configured to translationally urge the second mount engagement element away from the first mount engagement element along an axis that spans a pair of closest points on the circumferential surfaces of the first mount engagement element and the second mount engagement element within the plane.

Various embodiments of the present disclosure may include a rotatable mounting system. In some embodiments, the rotatable mounting system may include a rotatable mounting apparatus. In some embodiments, the rotatable mounting apparatus may include a first mount engagement element. In some embodiments, the first mount engagement element may include a plurality of slots. In some embodiments, the rotatable mounting apparatus may include a second mount engagement element. In some embodiments, the second mount engagement element may include one or more tabs. In some embodiments, the rotatable mounting system may include a spring configured to be disposed between at least a portion of the first mount engagement element and at least a portion of the second mount engagement element to urge at least one of the one or more tabs towards at least one of the plurality of slots. In some embodiments, the first mount engagement element and the second mount engagement element are rotatable relative to each other, such that a first tab of the one or more tabs is configured to engage a first slot of the plurality of slots at a first rotational position and engage a second slot of the plurality of slots at a second rotational position. In some embodiments, the rotatable mounting system may include a wearable device. In some embodiments, on the one hand, the wearable device is fixed at least rotationally with respect to the first mount engagement element and configured to be translatable relative to the second mount engagement element or, on the other hand, the wearable device is fixed at least rotationally with respect to the second mount engagement element and configured to be translatable relative to the first mount engagement element.

In some embodiments, the system may include an arm band that may be configured to be worn by a user. In some embodiments, the arm band may be connected to the rotatable mounting apparatus.

In some embodiments, wherein the wearable device may be a smart phone.

In some embodiments, the first mount engagement element may define a partially circular shape. In some embodiments, the plurality of slots may be disposed at a same radial position with respect to the first mount engagement element.

In some embodiments, the second mount engagement element may define a partially circular shape, and wherein the one or more tabs are disposed at a same radial position with respect to the second mount engagement element.

In some embodiments, the one or more tabs are radially positioned along a circumference of the second mount engagement element.

In some embodiments, the spring may be disposed along a portion of circumferential surfaces of the first mount engagement element and the second mount engagement element. In some embodiments, in an instance in which the spring is compressed, the spring is configured to translationally urge the second mount engagement element away from the first mount engagement element along an axis that spans a pair of closest points on the circumferential surfaces of the first mount engagement element and the second mount engagement element within the plane.

Various embodiments of the present disclosure may include a method for rotating a rotatable mounting apparatus. In some embodiments, the rotatable mounting apparatus may include a first mount engagement element. In some embodiments, the rotatable mounting apparatus may include a second mount engagement element. In some embodiments, the rotatable mounting apparatus may include a spring disposed between the first mount engagement element and the second mount engagement element. In some embodiments, the first mount engagement element may include a plurality of slots. In some embodiments, the second mount engagement element includes one or more tabs. In some embodiments, the method may include translating the first mount engagement element with respect to the second mount engagement element to compress the spring and disconnect at least a first tab of the one or more tabs from at least a first slot of the plurality of slots. In some embodiments, the method may include rotating the first mount engagement element with respect to the second mount engagement element. In some embodiments, the method may include releasing the first mount engagement element to permit the spring to engage at least the first tab with a second slot of the plurality of slots.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "I") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

Many individuals in their work and/or personal life use wearable devices, such as, but not limited to smart phones, scanners, computers, radio frequency identification devices, and other electronic device scanners. Various users and various use cases may have different preferred mounting orientations for the wearable devices. Embodiments of the present disclosure relate to wearable devices, mounting apparatuses, and associated devices, systems, and methods to facilitate improved mounting and adjustment of the wearable devices, such as on a person's body.

Various embodiments are described below that attempt to facilitate the speedy and ergonomic adjustment and positioning of a wearable device relative to a user's body or another mounting structure. In various situations, a user may attach a wearable device to an attachment mechanism to secure the device on their person or on an object near them (e.g., a work surface, a dashboard of a work vehicle, etc.). For example, a user may operably attach a wearable device to an attachment mechanism (e.g., an arm band), which may be secured to the user's arm or another mounting structure via the attachment mechanism.

In some embodiments, a user may rotate and fixedly position the wearable device in a plurality of rotational positions by means of various components located in the mounting apparatus. In some embodiments, the arm band may also facilitate rotation of the device in another degree of freedom around the user's arm or another mounting structure. In various embodiments, the mounting apparatus may include a first mount engagement element and a second mount engagement element capable of being moved relative to each other. The first mount engagement element may be fixed in relation to the attachment mechanism (e.g., it may be fixedly connected and unable to rotate or translate relative to the arm band) while the second mount engagement element may be translatable and/or rotatable in relation to the attachment mechanism and the first mount engagement element. In such embodiments, the first mount engagement element may be referred to as a fixed mount engagement element, understanding that the "fixed" nature is within a given reference frame and not necessarily absolute, and the second mount engagement element may be referred to as a rotatable engagement element. In some embodiments, the elements may be reversed, and the second mount engagement element may be referred to as the fixed engagement element coupled fixedly to the attachment mechanism, while the first engagement element is the rotatable engagement element. In this manner, the respective engagement components and portions of the elements described herein may be exchanged between sides of the mount without altering the function of the mount (e.g., the "tabs" may be disposed on either element, and the "slots" may be disposed on the other element). Similarly, either element of the mount may be disposed within or surround the other element without altering the function of the mount. In some embodiments, an exterior surface of a mount engagement element may always have "tabs" while an interior surface of a mount engagement element may always have "slots" (e.g., the structure forming the tabs and slots may be the same, only viewed from opposite sides).

In some embodiments, a spring, such as a linear wave spring, may be disposed between or otherwise able to exert force between, the first mount engagement element and the second mount engagement element to urge the two elements into engagement with each other (e.g., urge at least one tab into at least one slot). In some embodiments, the user may apply a force to the wearable device, which in turn applies a force to one of the first mount engagement element or the second mount engagement element to compress the spring and disconnect the respective tab(s) and slot(s) and to allow the rotation of the rotating mount engagement element relative to the fixed mount engagement element. Releasing the wearable device may permit the respective tab(s) to engage another of the respective slot(s) to hold the wearable device in the new position. In some embodiments, the spring may apply a translational force between the first mount engagement element and the second mount engagement element while allowing the elements to rotate with minimal or no force between the spring and element(s) (e.g., frictional forces against a smooth surface or substantially smooth surface).

In at least this way, the attachment mechanism may remain in a fixed position on a user's arm band (or a work surface) while allowing adjustability of the wearable device between two or more orientations. In some embodiments, the fixed engagement element of the rotatable mounting apparatus may have multiple slots or multiple tabs to which the rotatable engagement element may connect. In various embodiments, the mounting apparatus may enable a user to rotate a wearable device up to 180°. In some embodiments, the mounting apparatus may be rotatable up to 360 degrees. In some embodiments, the tabs may ensure that the spring is pushed to the rear (i.e., opposite the tabs and slots that receive them) of the mount to apply consistent engaging force to interlock the tabs. In some embodiments, tabs may be positioned on a portion of one of the engagement elements along an arc of 180 degrees or less, with the spring being configured to be disposed adjacent the remaining 180 degrees or more not having the tabs. In some embodiments, the slots may be positioned along some or all of the 360 degree circumference of the other engagement element. This positioning can, in some embodiments, enable different users of different handedness (e.g., one right handed user and one left handed user) to rotate the same wearable device into positions that are suitable for each user.

Figure 1A:
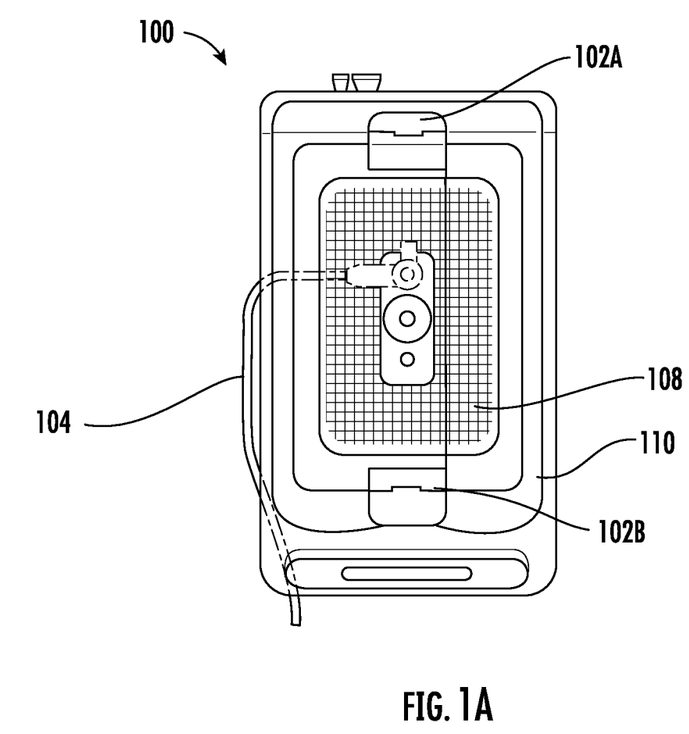
FIGS. 1A and 1B are top views of an example wearable device and rotating mount apparatus, respectively, in accordance with various embodiments of the present disclosure.
Figure 1B:
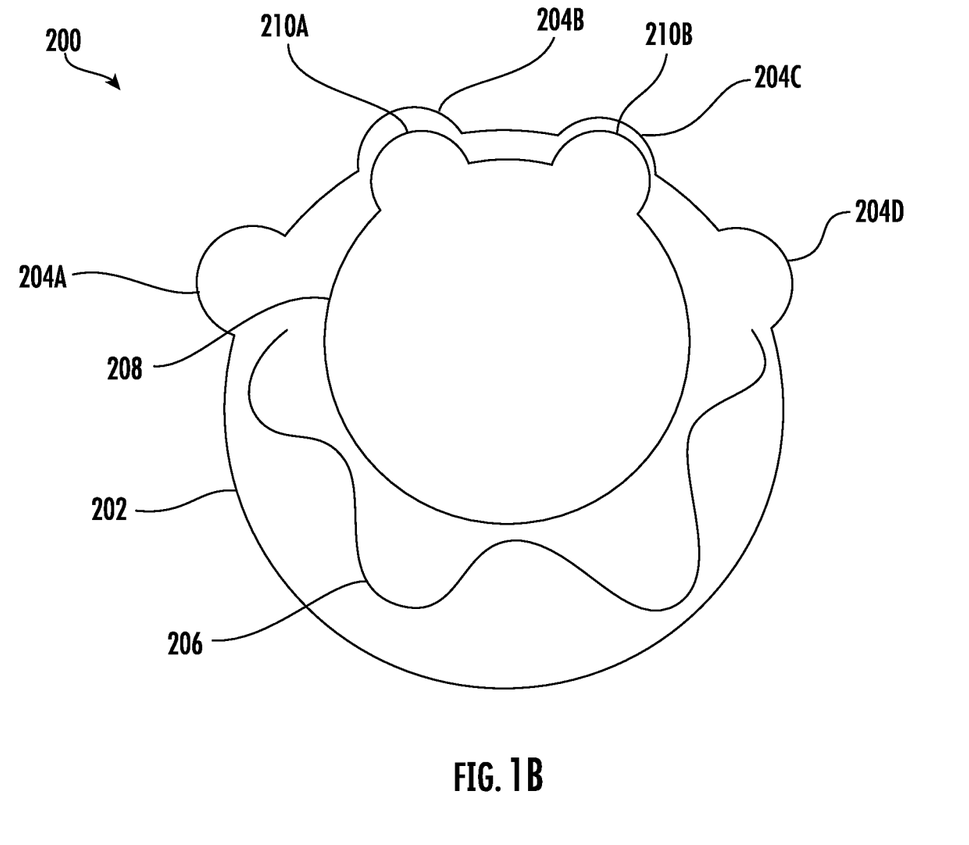

Example Systems and Apparatuses for Rotating or Rotatable Mount for Wearable Devices FIG. 1A is a top view of an example wearable device 100 in an instance in which the wearable device is facing upward, and FIG. 1B is a simplified cross-sectional view of the corresponding rotatable mounting apparatus 200 in accordance with various embodiments of the present disclosure.

According to some embodiments, FIGS. 1A and 1B show an example wearable device 100 in a first position and a corresponding rotatable mounting apparatus 200. According to some embodiments, FIG. 1A depicts a top view of an example wearable device 100. According to other embodiments, FIG. 1B depicts the rotatable mounting apparatus 200 located in a first position. In some embodiments, the orientation of the wearable device in FIG. 1A may match the orientation of the components of the rotatable mounting apparatus 200 in FIG. 1B.

In some embodiments, the wearable device 100 has a plurality of slots 102A, 102B. In some embodiments, these slots 102A 102B may be predesigned (e.g., molded during the manufacture of the device 100) and may facilitate engagement between a main body of the wearable device and a back plate 110 (e.g., a battery cover). In some embodiments, the wearable device may be configured with any other structure. In some embodiments, the wearable device 100 may include a connection cable 104. In some embodiments, the connection cable 104 may be connected to a radio frequency identification (RFID) antenna. In some embodiments, the wearable device 100 may have a textured surface 106 that may include a portion of the wearable device's back plate 110 or a portion of the top surface 108 of the device if no back plate is present. In some embodiments, the wearable device 100 may be a mobile device, such as a smartphone.

In some embodiments, and as shown in FIG. 1B, the rotatable mounting apparatus 200 may include a first mount engagement element 202 In some embodiments, the first mount engagement element 202 may be a fixed engagement element; that is, in some embodiments, the first mount engagement element 202 does not move in relation to the arm band or other attachment mechanism. In some embodiments, the second mount engagement element 208 may be the fixed engagement element 202; that is, in some embodiments, the second mount engagement element 208 does not move in relation to the arm band or other attachment mechanism. In some embodiments, the rotatable mounting apparatus 200 may be attached to a wearable device 100 and/or to a user (e.g., via an attachment mechanism such as a user's glove, forearm, belt, arm band, etc.); in other embodiments, the rotatable mounting apparatus 200 may be attached to a work surface (e.g., to a work bench, a dashboard of a vehicle, etc.), in which embodiments the attachment mechanism may be the work surface itself or one or more components connecting the mounting apparatus and wearable device thereto.

In some embodiments, the fixed engagement element 202 may include a plurality of slots 204A, 204B, 204C, 204D. Each of the slots 204A, 204B, 204C, and 204D corresponds to a discrete angle to which a wearable device 100 may be rotated relative to the attachment mechanism. Although four slots are shown in FIGS. 1B, 2B, 3B, and 4B and described in this disclosure, it will be understood that the first engagement element 202 may contain additional or fewer slots. For example, in some embodiments, it may be desirable to have more slots (e.g., to achieve more rotation angles). However, it may be desirable in other embodiments to have fewer slots (e.g., to achieve a simpler design). In some embodiments, the slots 204A, 204B, 204C, and 204D may enable rotation of angles up to 180 degrees (e.g., the angular distance between the most extreme slots 204A, 204D may be up to 180 degrees). In some embodiments, the slots may enable rotation of greater than 180 degrees. In some embodiments, rotation may be at least partially limited by the length of the cable 104. In some embodiments, rotation may be limited by other various components of the wearable device 100. In further embodiments, rotation may be limited by the wearable device and/or surface to which the rotatable mount apparatus 200 is attached. It will be understood that, in some embodiments, the stop location may be adjusted depending on the desired user experience.

In some embodiments, the first mount engagement element 202 may include a portion that is at least partially circular (e.g., including, but not limited to, circular in cross-section but-for the slots/tabs). In some embodiments, the slots 204A, 204B, 204C, 204D are positioned radially along a circumference of the at least partially circular portion of the first mount engagement element 202 (e.g., protruding a same radial distance from a center of the first mount engagement element 202). As shown in at least FIGS. 1B, 2B, 3B, and 4B, the slots 204A-204D may be disposed radially along the outer circumference of the at least partially circular portion of the first mount engagement element 202. In some embodiments, the slots 204A-204D may be disposed at equal radial distances (e.g., protruding a same radial distance from a center of the second mount engagement element 208) and may be disposed along the outer circumference of the second mount engagement element 208 in an instance in which the second mount engagement element 208 includes the slots (e.g., an embodiment in which the first mount engagement element comprises the tabs). In some embodiments, the slots and tabs may additionally or alternatively be reversed to face inward rather than outward in any configuration that permits the slots and tabs to engage. In some embodiments, the plurality of slots 204A-204D may be positioned along an arc measuring 180 degrees or less along the circumference of the at least partially circular portion of the first mount engagement element 202. In such embodiments, a user may rotate the wearable device 100 up to 180 degrees; in some embodiments, this may enable a left-handed user and a right-handed user to use the same wearable device 100 and/or rotatable mounting apparatus 200.

In some embodiments, the mounting apparatus 200 may include a spring 206. In some embodiments, the spring 206 may be a linear wave spring 206. However, it will be understood that, in some embodiments, the spring 206 may be other types of springs that are suitable for the mounting apparatus 200. In some embodiments, the linear wave spring 206 may be attached to a second mount engagement element 208. In some embodiments, the second mount engagement element 208 may rotate or otherwise pivot and/or move in relation to the mount 200. In some embodiments, the second mount engagement element 208 may include a plurality of tabs (e.g., two tabs 210A, 210B). In some embodiments, these tabs 210A, 210B may be configured to operably connect to the slots 204A, 204B, 204C, 204D. FIG. 1B shows the tabs 210A, 210B in a first position, rotated into the slots of 204B and 204C, respectively. In some embodiments, the rotating mount engagement element 208 may make use of only a single tab 210A. In other embodiments, the rotating mount engagement element 208 may make use of more than two tabs 210A, 210B. In some embodiments, the second mount engagement element 208 may include a portion that is at least partially circular (e.g., including, but not limited to, circular in cross-section but-for the slots/tabs). In some embodiments, the tabs 210A, 210B may be disposed along a circumference of the at least partially circular portion of the second mount engagement element 208. In some embodiments, first mount engagement element 202 may include the tabs while the second mount engagement element 208 includes the slots. In some embodiments, in which the spring 206 does not stick in one or more of the slots 204A-D, the slots 204A-D may enable rotation angles of up to 360 degrees.

In some embodiments, the spring 206 (e.g., a wave spring) may be disposed between the at least partially circular portion of the first mount engagement element 202 and the at least partially circular portion of the second mount engagement element 208. In some embodiments, at certain points in the operation of the rotatable mounting apparatus 200, the at least partially circular portion of the first and second mount engagement elements 202, 208 may be coaxial with each other, and the respective axes may be movable relative to each other within the degrees of freedom allowed by the mounting apparatus 200 (e.g., rotationally and translationally along the plane of the paper for FIGS. 1B, 2B, 3B, and 4B). In some embodiments, as the spring 206 is disposed between the first mount engagement element 202 and the second mount engagement element 208, and the force applied by the spring 206 may be applied in the opposite direction of the direction in which the spring is being compressed (e.g., outwardly against the outermost of the mount engagement elements and inwardly against the innermost of the mount engagement elements). In some embodiments, during compression of the spring (e.g., in an instance in which the tabs and slots are disconnected) this force may be applied on the closest two points between the first and second mount engagement elements 202, 208 opposite the tabs and slots and within the plane of the figures (e.g., the closest point between the innermost and outermost mount engagement elements during compression of the spring may correspond to the net force vector because the spring may be most highly compressed at this location). In some embodiments, the partially circular surfaces of the first and second mount engagement elements may be complementary shapes. In some embodiments, the partially circular surfaces of the first and second mount engagement elements may be configured to allow the mount engagement elements to rotate relative to each other without substantially compressing the spring, such that the spring may primarily or entirely provide translational force while allowing the mount engagement elements to be held in multiple rotational positions.

Rotation of the wearable device 100 by means of the rotatable mounting apparatus 200 will now be described in reference to FIGS. 1A, 1B, 2A, 2B, 3A, 3B, 4A, and 4B, which depict the movement of the device 100 from an example first position (e.g., FIGS. 1A and 1B) to an example second position (e.g., FIGS. 4A, 4B), according to some embodiments. These figures are not limiting as to the number and combination of positions that may be possible. As indicated in at least FIGS. 2A, 2B, 3A, 3B, 4A, and 4B in some embodiments, force may be applied to the spring 206 by movement of the wearable device 100 and/or a portion of the mounting apparatus 200 to thereby move the wearable device 100 from a first position to a second position. The movement of these various components are indicated by the arrows 112, 114, 116, 118, 120, and 122.

Figure 2A:
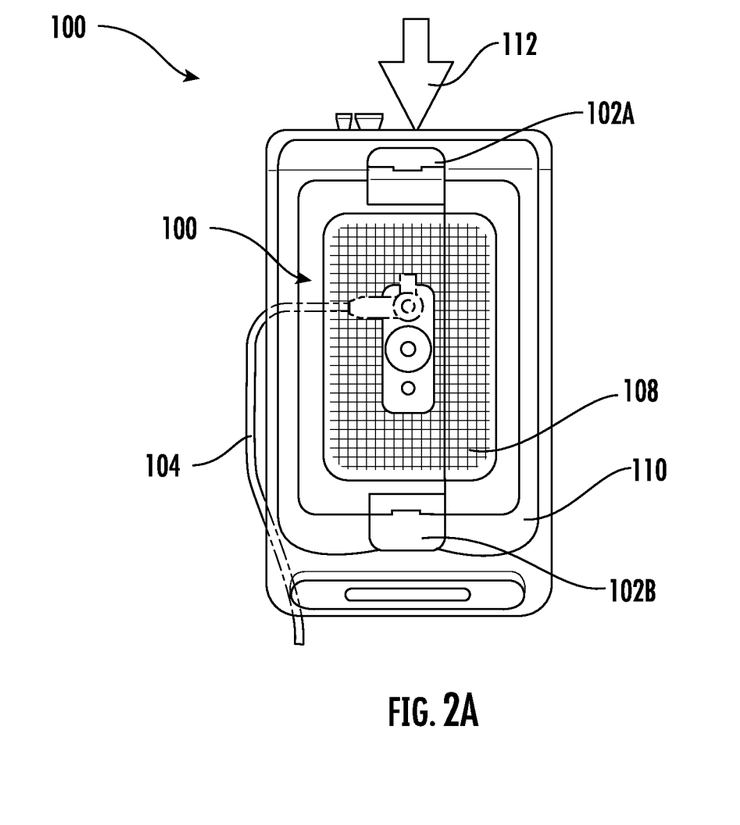
FIGS. 2A and 2B are top views of an example wearable device and rotating mount apparatus, respectively, in accordance with various embodiments of the present disclosure.
Figure 2B:
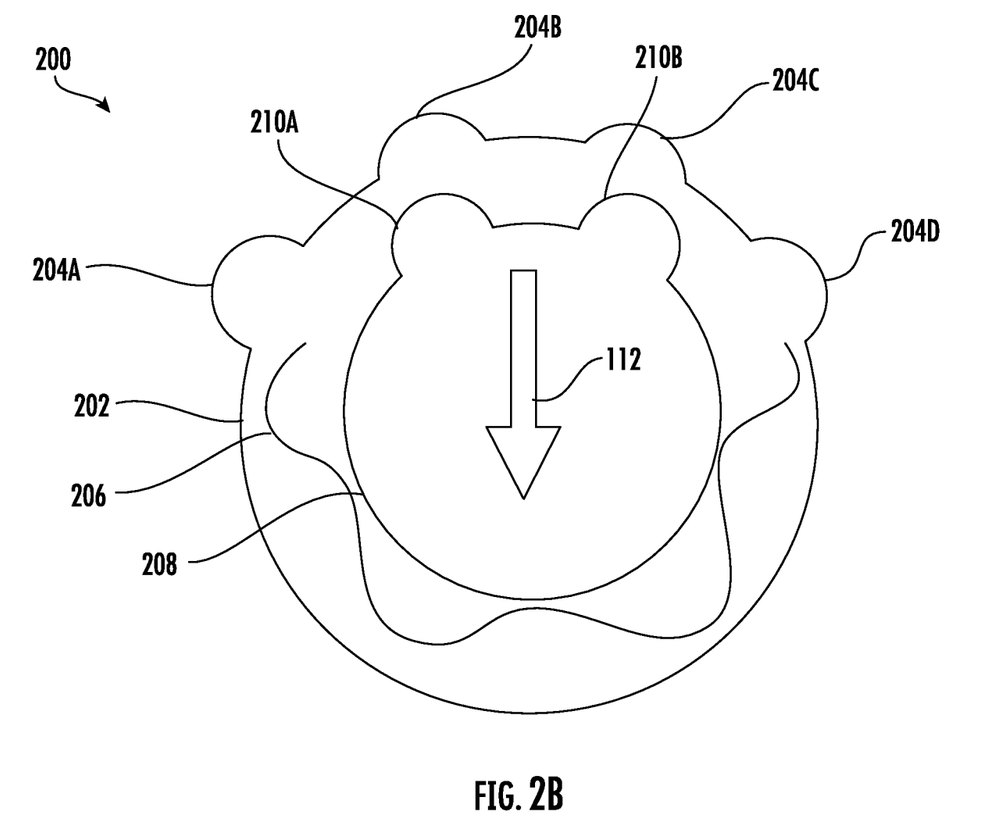

FIGS. 2A and 2B are top and bottom views, respectively, of an example wearable device 100 and rotatable mounting apparatus 200, respectively, in accordance with various embodiments of the present disclosure. In some embodiments, as shown in FIGS. 2A and 2B, the linear wave spring 206 may be compressed to enable rotation of the rotating part 208. In some embodiments, the spring 206 may be compressed by sliding it down and/or by means of pushing down the spring 206 by means of a force applied and indicated as the arrow 112 via movement of a portion of the mounting apparatus 200 in at least FIGS. 2A and 2B (e.g., the second mount engagement element 208 is shown translated downwardly relative to the first mount engagement element 202 relative to the perspective of FIG. 2B). For example, in some embodiments, a user may press down according to the arrow shown in FIG. 2A to compress the linear wave spring 206 and thereby, as shown in at least FIG. 2B, disconnect the plurality of tabs 210A, 210B from the respective slots 204B, 204C. In some embodiments, the user may keep the spring 206 remains compressed, such that the rotating mount engagement element 208 will not "snap back" into the slots 204B, 204C. Subsequently, in some embodiments, a user may then rotate rotating mount engagement element to at least one new rotational position (e.g., tab 210B may engage slot 204D, as will be further described in reference to FIGS. 3A, 3B, 4A, and 4B).

Figure 3A:
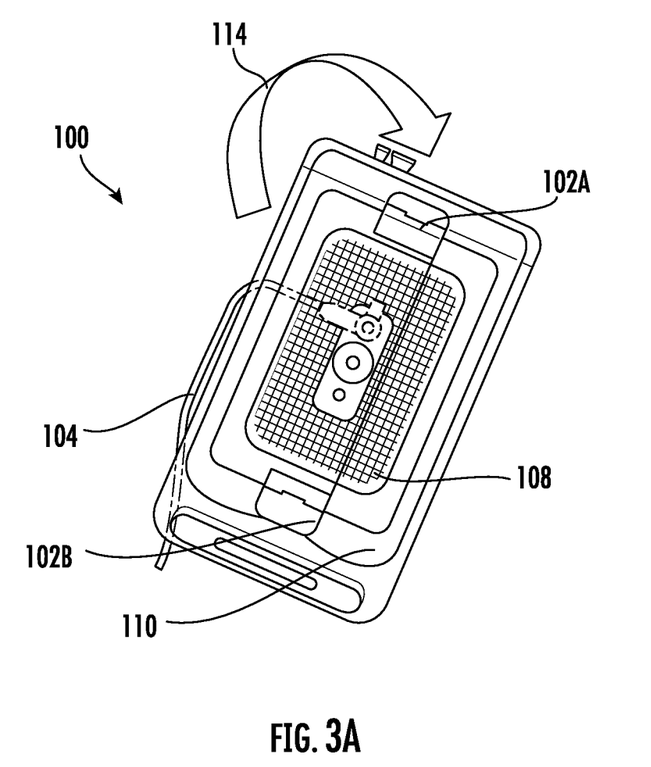
FIGS. 3A and 3B are top views of an example wearable device and rotating mount apparatus, respectively, in accordance with various embodiments of the present disclosure.
Figure 3B:
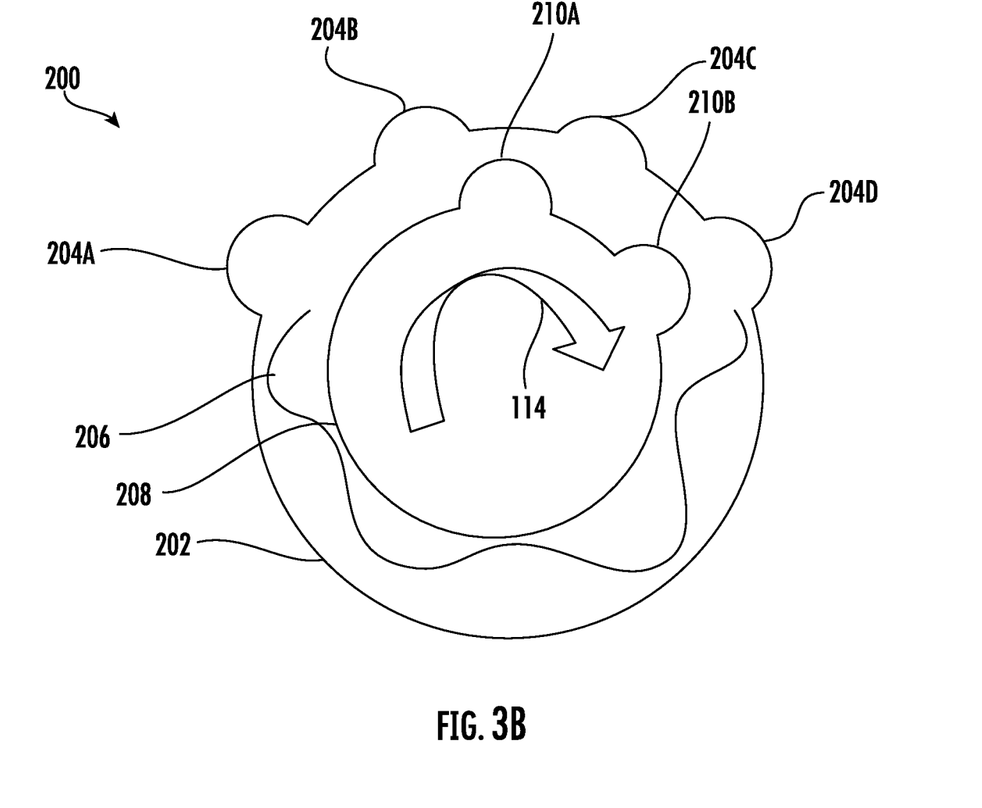

FIGS. 3A and 3B are top and bottom views, respectively, of an example wearable device 100 and corresponding rotatable mounting apparatus 200, respectively, in accordance with various embodiments of the present disclosure. In some embodiments, as indicated by the arrows in FIGS. 3A and 3B, the wearable device 100 may be rotated by manipulating the wearable device to adjust the rotating mount engagement element (e.g., the first or second mount engagement element depending on the embodiment), as shown in at least FIGS. 3A and 3B and as indicated by the arrow 114. In some embodiments, while the spring 206 remains compressed, the rotating engagement element 208 may be rotated to align the tabs 210A, 210B with different slots (e.g., 204C, 204D), while the spring slides along one or both of the partially circular surfaces of the mount engagement elements 202, 208. In some embodiments, the spring 206 may be configured to not or to minimally resist rotational force 114 while applying a strong, translational force to operably engage the tabs 210A, 210B into the slots 204A-204D.

Figure 4A:
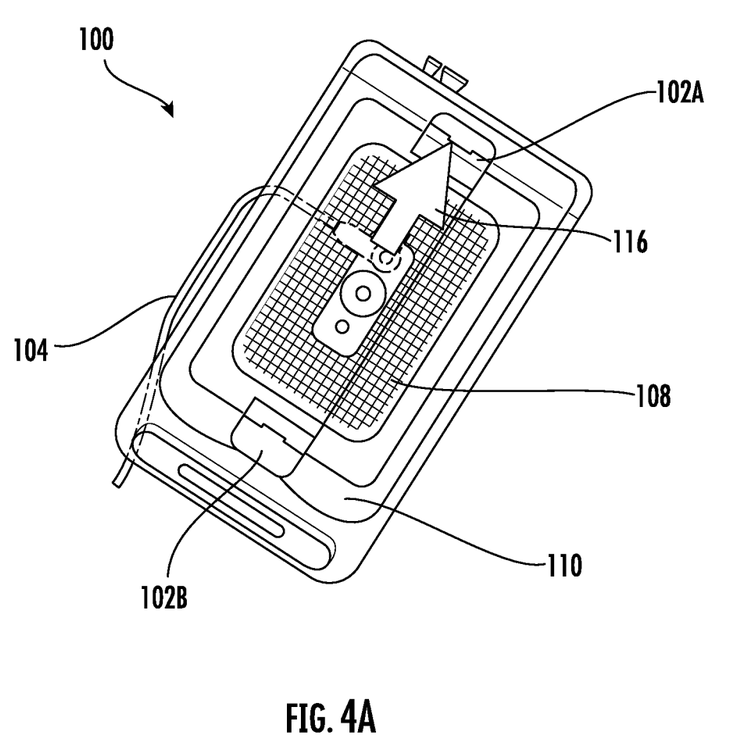
FIGS. 4A and 4B are top views of an example wearable device and rotating mount apparatus, respectively, in accordance with various embodiments of the present disclosure.
Figure 4B:
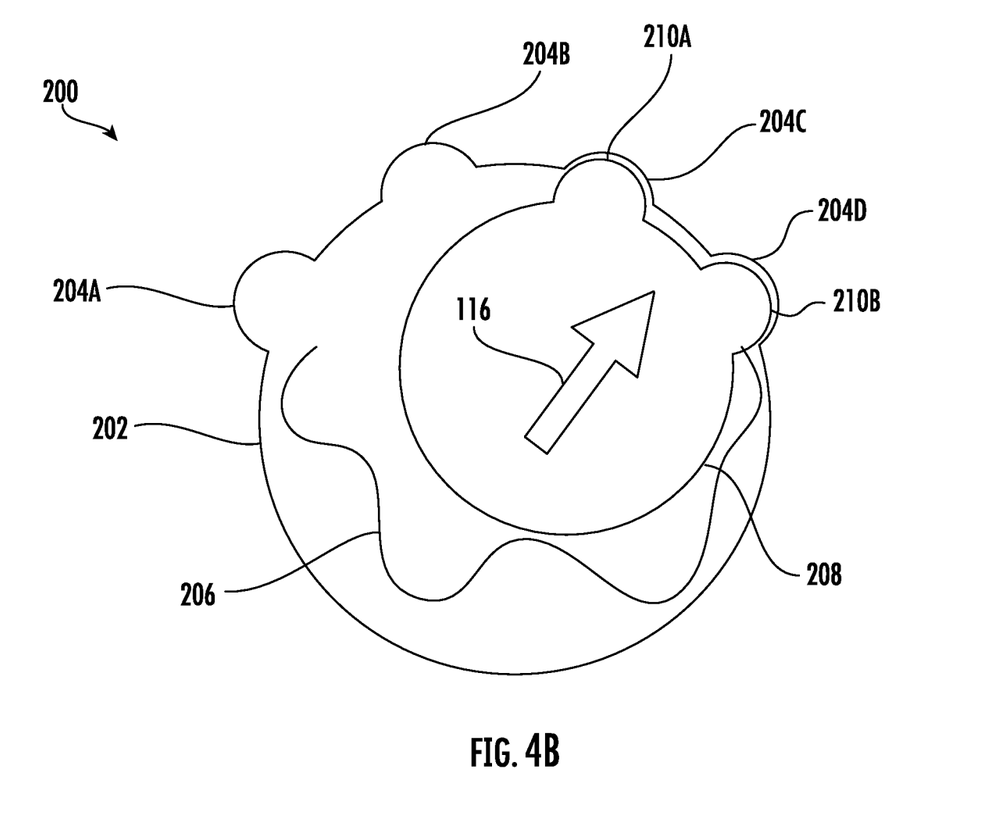

FIGS. 4A and 4B are top and bottom views, respectively, of an example wearable device 100 and corresponding diagram for the rotatable mounting apparatus 200, respectively, in accordance with various embodiments of the present disclosure. In some embodiments, as shown in FIG. 4A, once the wearable device 100 has been rotated into the desired configuration (e.g., when the rotating engagement element (the second mount engagement element 208 in the depicted embodiment) has been rotated to the desired position), the spring 206 may be released and decompressed, thereby operably connecting the tabs 210A, 210B into the slots 204C, 204D. In some embodiments, as shown in at least FIGS. 4A and 4B, the decompression force is indicated by the arrow 116 showing the direction of relative movement between the components. In some embodiments, the device 100 is now locked into the desired position (e.g., the tabs 210A, 210A are locked into the slots 204C, 204D in the depicted embodiment).

Figure 5:
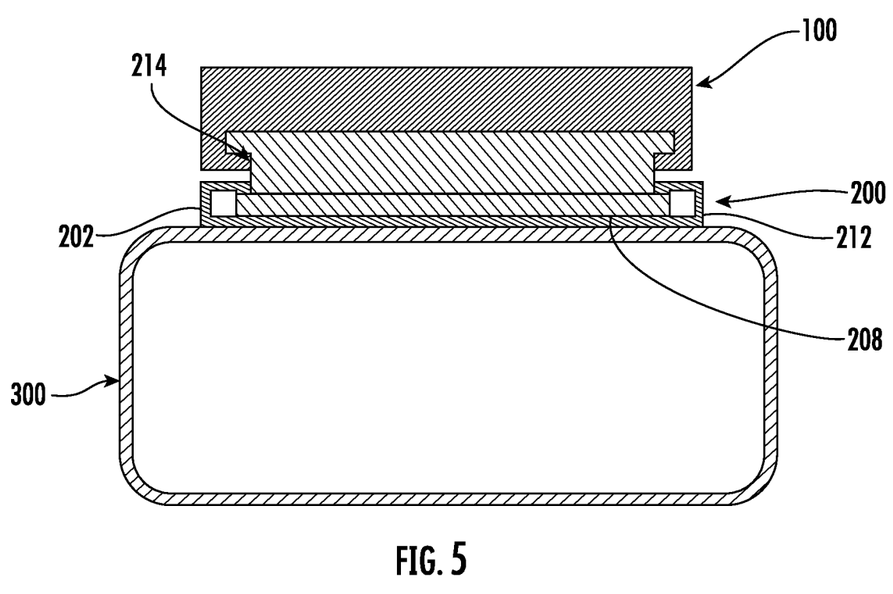
FIG. 5 is a side view of an example wearable device and rotating mount apparatus, in accordance with various embodiments of the present disclosure.

FIG. 5 is a simplified side view of an example wearable device 100 and rotating mount apparatus 200, in accordance with various embodiments of the present disclosure. In some embodiments, the rotatable mounting apparatus 200 may be attached to an attachment mechanism 300 (e.g., an arm band or other mechanism for coupling the wearable device and mounting apparatus to an arm or another mounting structure). In some embodiments, and as shown in at least FIG. 5, the attachment mechanism 300 may be an arm band configured to be worn on the arm of a user. It will be understood that, in some embodiments, the attachment mechanism 300 may be any mechanism (e.g., suction mounts, adhesive mounts, straps, harnesses, tripods, stands, etc.) to which a user may desire to use for attaching the rotatable mounting apparatus 200 and wearable device 100 to a mounting structure.

In some embodiments, and as shown in the embodiment of FIG. 5, the first mount engagement element 202 may be fixed to the attachment mechanism 300 and may have an outer surface 212. In some embodiments, the second mount engagement element 208 may rotate and may have a shaft 214 or other coupling portion that links the second mount engagement element 208 with the wearable device 100. In some embodiments, the shaft 214 of the second mount engagement element 208 may form a connection between the element 208 and the wearable device 100. In some embodiments, the shaft 214 may include a plurality of interlocking features that may be configured to interlock with the example wearable device 100 and/or the second mount engagement element 208. For example, in some embodiments, the shaft's 214 interlocking features may include one or more receptors configured to receive one or more corresponding pins. In some embodiments, each interlocking feature may have one or more pins and one or more receptors configured to interlock with the other interlocking feature. In some embodiments, the first mount engagement element 202 may be fixedly engaged to the attachment mechanism 300. In some embodiments, the second mount engagement element 208 may fixedly engage and rotate with a wearable device 100. In some embodiments, one or more of the aforementioned components may be reversed (e.g., the shaft may extend from the attachment mechanism 300, while the first mount engagement element 202 engages the wearable device 100). In some embodiments, the innermost of the two mount engagement elements may include the shaft 214 while the outermost may include the outer surface 212 configured to house the innermost mount engagement element (e.g., the outer surface may be part of a larger housing or may be the outer surface of first engagement element 202 shown in FIGS. 1B, 2B, 3B, 4B). In some embodiments, the example wearable device 100 may be fixedly connected to the rotatable mounting apparatus 200, thereby making a single assembly of 100 and 200. In other embodiments, the rotatable mounting apparatus 200 may be rigidly fixed to the attachment mechanism 300 (e.g., by fasteners such as screws and/or rivets), thereby making a single assembly of 200 and 300.

Figure 7:
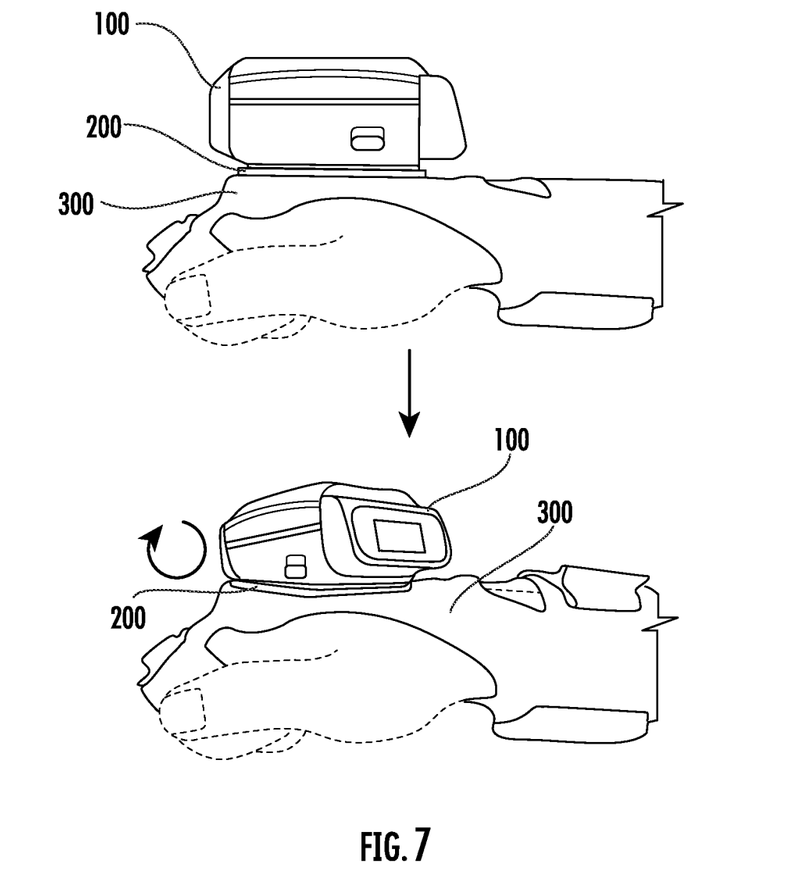
FIG. 7 is a side view of an example wearable device and rotating mount apparatus in accordance with various embodiments of the present disclosure.

In at least this way, and as shown in at least FIG. 7, the rotatable mounting apparatus 200 may enable a user to rotate a wearable device 100 in relation to the attachment mechanism 300 (e.g., an arm band worn by the user) and thereby rotate the wearable device 100 into multiple orientations. For example, in some embodiments, a left-handed user may take a wearable device 100 also usable by a right-handed user, attach the wearable device 100 to the rotatable mounting apparatus 200, attach the rotatable mounting apparatus 200 to the attachment mechanism 300 (e.g., an arm band, if not already coupled to the rotatable mounting apparatus), and rotate the second mount engagement element 208 up to 180 degrees to thereby enable the wearable device 100 to be used effectively by a left-handed user. It will be understood that there are numerous other useful implementations of the rotatable mounting apparatus 200 consistent with the present disclosure. For example, in some embodiments, a user may desire to have the wearable device 100 placed perpendicular to the attachment mechanism 300 and may therefore rotate the second mount engagement element 208 by 90 degrees relative to a parallel orientation. In other embodiments, a user may desire to have the wearable device positioned at any number of discrete angles and may therefore rotate the second mount engagement element 208 by said angle. The mounting apparatus 200 may be configured with corresponding tab(s) and slot(s) to facilitate such discrete positioning. It will be understood that, in some embodiments, there may be greater or fewer rotational positions for the rotatable mounting apparatus 200 depending on the number slots 204A-204D and the corresponding number of tabs 210A, 210B.

Example Methods of Rotating a Rotatable Mounting Apparatus

Figure 6:
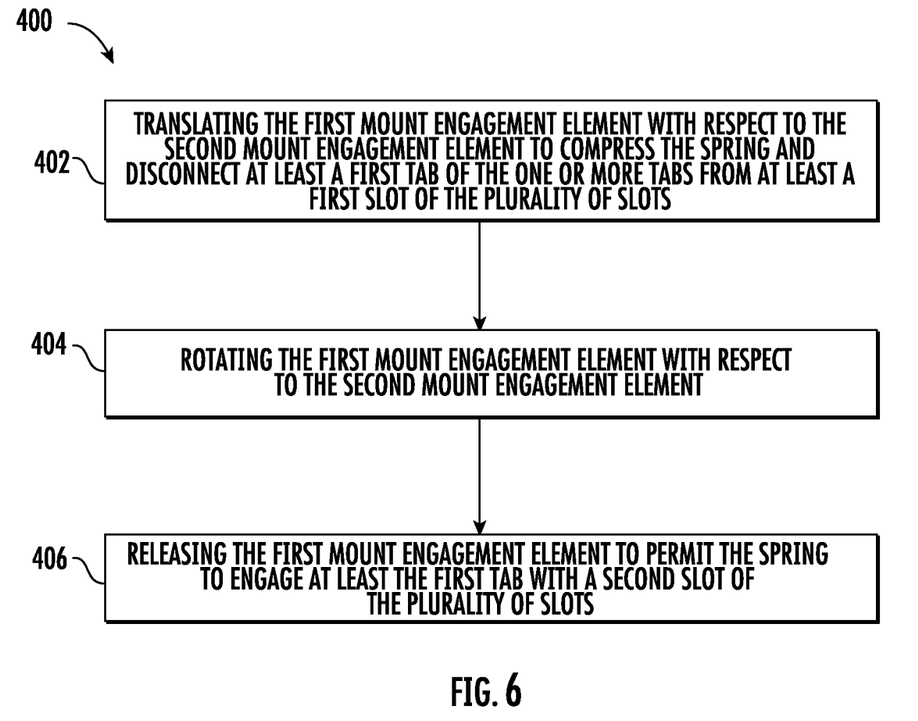
FIG. 6 is a flow diagram of an example method for rotating a rotatable mount in accordance with various embodiments of the present disclosure.

According to some embodiments, and as shown in at least FIG. 6, a method 400 is provided for rotating a rotatable mounting apparatus 200. According to some embodiments, method 400 is made in reference to the wearable device 100 and rotatable mounting apparatus 200 described in at least FIGS. 1A, 1B, 2A, 2B, 3A, 3B, 4A, 4B, 5, and 7 and the preceding portions of this disclosure. However, it will be understood that the method 400 may also be performed in reference to other suitable devices, systems, and components.

In some embodiments, the method 400 may include a step 402 of translating the first mount engagement element with respect to the second mount engagement element to compress the spring and disconnect at least a first tab of the one or more tabs from at least a first slot of the plurality of slots. In some embodiments, the method 400 may include a step 404 of rotating the first mount engagement element with respect to the second mount engagement element. In some embodiments, the method 400 may include a step 406 of releasing the first mount engagement element to permit the spring to engage at least the first tab with a second slot of the plurality of slots.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A rotatable mounting apparatus comprising:
   a first mount engagement element, wherein the first mount engagement element comprises a plurality of slots;
   a second mount engagement element, wherein the second mount engagement element comprises one or more tabs; and
   a spring configured to be disposed between at least a portion of the first mount engagement element and at least a portion of the second mount engagement element to urge at least one of the one or more tabs towards at least one of the plurality of slots, p1 wherein the first mount engagement element and the second mount engagement element are rotatable relative to each other, such that a first tab of the one or more tabs is configured to engage a first slot of the plurality of slots at a first rotational position and engage a second slot of the plurality of slots at a second rotational position,
   wherein the second mount engagement element is configured to translate and rotate along a plane relative to the first mount engagement element.

2. The rotatable mounting apparatus of claim 1, wherein the first mount engagement element defines a partially circular shape, and wherein the plurality of slots is disposed at a same radial position with respect to the first mount engagement element.

3. The rotatable mounting apparatus of claim 2, wherein the second mount engagement element defines a partially circular shape, and wherein the one or more tabs are disposed at a same radial position with respect to the second mount engagement element.

4. The rotatable mounting apparatus of claim 3, wherein the spring is configured to be disposed between the at least partially circular shape of the first mount engagement element and the at least partially circular shape of the second mount engagement element.

5. The rotatable mounting apparatus of claim 3, wherein the plurality of slots is radially positioned along a circumference of the first mount engagement element.

6. The rotatable mounting apparatus of claim 5, wherein the plurality of slots is radially positioned along an arc measuring 180 degrees or less along the circumference of the first mount engagement element.

7. The rotatable mounting apparatus of claim 1, wherein the spring comprises a linear wave spring disposed along a portion of circumferential surfaces of the first mount engagement element and the second mount engagement element.

8. The rotatable mounting apparatus of claim 1, wherein the spring comprises a circular spring.

9. The rotatable mounting apparatus of claim 1, wherein the second mount engagement element is a rotating element configured to fixedly engage and rotate with a wearable device, and wherein the first mount engagement element is a fixed element configured to fixedly engage an attachment mechanism.

10. The rotatable mounting apparatus of claim 1, wherein the spring is configured to translationally urge the second mount engagement element relative to the first mount engagement element in one or more directions along the plane while permitting the second mount engagement element to be disposed at a plurality of rotational positions relative to the first mount engagement element.

11. The rotatable mounting apparatus of claim 10, wherein the spring is disposed along a portion of circumferential surfaces of the first mount engagement element and the second mount engagement element, and in an instance in which the spring is compressed, the spring is configured to translationally urge the second mount engagement element away from the first mount engagement element along an axis that spans a pair of closest points on the circumferential surfaces of the first mount engagement element and the second mount engagement element within the plane.

12. A rotatable mounting system comprising:
   a rotatable mounting apparatus, wherein the rotatable mounting apparatus comprises:
      a first mount engagement element, wherein the first mount engagement element comprises a plurality of slots;
      a second mount engagement element, wherein the second mount engagement element comprises one or more tabs; and
      a spring configured to be disposed between at least a portion of the first mount engagement element and at least a portion of the second mount engagement element to urge at least one of the one or more tabs towards at least one of the plurality of slots,
      wherein the first mount engagement element and the second mount engagement element are rotatable relative to each other, such that a first tab of the one or more tabs is configured to engage a first slot of the plurality of slots at a first rotational position and engage a second slot of the plurality of slots at a second rotational position; and
   a wearable device, wherein one of, on the one hand, the wearable device is fixed at least rotationally with respect to the first mount engagement element and configured to be translatable relative to the second mount engagement element or, on the other hand, the wearable device is fixed at least rotationally with respect to the second mount engagement element and configured to translatable relative to the first mount engagement element.

13. The rotatable mounting system of claim 12 further comprising an arm band that is configured to be worn by a user, wherein the arm band is connected to the rotatable mounting apparatus.

14. The rotatable mounting system of claim 12, wherein the wearable device is a smart phone.

15. The rotatable mounting system of claim 12, wherein the first mount engagement element defines a partially circular shape, and wherein the plurality of slots is disposed at a same radial position with respect to the first mount engagement element.

16. The rotatable mounting system of claim 12, wherein the second mount engagement element defines a partially circular shape, and wherein the one or more tabs are disposed at a same radial position with respect to the second mount engagement element.

17. The rotatable mounting system of claim 12, wherein the one or more tabs are radially positioned along a circumference of the second mount engagement element.

18. The rotatable mounting system of claim 12, wherein the spring is disposed along a portion of circumferential surfaces of the first mount engagement element and the second mount engagement element, and in an instance in which the spring is compressed, the spring is configured to translationally urge the second mount engagement element away from the first mount engagement element along an axis that spans a pair of closest points on the circumferential surfaces of the first mount engagement element and the second mount engagement element within the plane.

19. A method for rotating a rotatable mounting apparatus, wherein the rotatable mounting apparatus comprises a first mount engagement element, a second mount engagement element, and a spring disposed between the first mount engagement element and the second mount engagement element, wherein the first mount engagement element comprises a plurality of slots and wherein the second mount engagement element comprises one or more tabs, the method comprising:
   translating the first mount engagement element with respect to the second mount engagement element to compress the spring and disconnect at least a first tab of the one or more tabs from at least a first slot of the plurality of slots;
   rotating the first mount engagement element with respect to the second mount engagement element; and
   releasing the first mount engagement element to permit the spring to engage at least the first tab with a second slot of the plurality of slots.

* * * * *